United States Patent [19]

Hansel

[11] Patent Number: 4,899,670
[45] Date of Patent: Feb. 13, 1990

[54] MEANS FOR PROVIDING OXYGEN ENRICHMENT FOR SLURRY AND LIQUID FUEL BURNERS

[75] Inventor: James G. Hansel, Emmaus, Pa.

[73] Assignee: Air Products and Chemicals, Inc., Allentown, Pa.

[21] Appl. No.: 282,156

[22] Filed: Dec. 9, 1988

[51] Int. Cl.$^4$ .................................... F23D 1/02
[52] U.S. Cl. ................................ 110/264; 110/260; 110/347; 431/183; 431/185
[58] Field of Search ............... 431/185, 182, 183; 110/264, 347, 309, 313, 260

[56] References Cited

U.S. PATENT DOCUMENTS

| | | | |
|---|---|---|---|
| 2,320,576 | 6/1943 | Dunn | 158/1.5 |
| 2,823,628 | 2/1958 | Poole et al. | 110/28 |
| 2,900,930 | 8/1959 | Cermak | 110/28 |
| 3,124,086 | 3/1964 | Sage et al. | 110/7 |
| 3,258,917 | 7/1966 | Sargent et al. | 60/39.06 |
| 3,286,666 | 11/1966 | Ohlsson | 110/28 |
| 3,332,853 | 7/1967 | Urquhart | 202/121 |
| 3,391,981 | 7/1968 | Voorheis et al. | 431/185 |
| 4,132,180 | 1/1979 | Fredrick | 110/244 |
| 4,147,116 | 4/1979 | Graybill | 110/263 |
| 4,193,773 | 3/1980 | Staudinger | 48/210 |
| 4,351,251 | 9/1982 | Brashears | 110/261 |
| 4,397,295 | 8/1983 | Bakker | 431/185 |
| 4,407,205 | 10/1983 | Beaufrere | 110/264 |
| 4,422,388 | 12/1983 | Raskin | 110/261 |
| 4,492,171 | 1/1985 | Brashears et al. | 110/261 |
| 4,515,090 | 12/1983 | Brashears et al. | 110/264 |
| 4,515,094 | 5/1985 | Azuhata et al. | 110/347 |
| 4,515,095 | 5/1985 | Greskovich | 110/347 |
| 4,519,322 | 5/1985 | Linsdstrom et al. | 110/264 |
| 4,523,529 | 6/1985 | Poll | 110/263 |
| 4,541,796 | 9/1985 | Anderson | 431/187 |
| 4,561,364 | 12/1985 | Green et al. | 110/347 |
| 4,591,331 | 5/1986 | Moore | 431/16 |
| 4,614,159 | 9/1986 | Sugiura et al. | 110/264 X |
| 4,701,124 | 10/1987 | Maghon et al. | 431/185 X |

*Primary Examiner*—Edward G. Favors
*Attorney, Agent, or Firm*—Geoffrey L. Chase; James C. Simmons; William F. Marsh

[57] ABSTRACT

A fuel or coal-water slurry burner with oxygen supply to the primary air through the vanes of a diffuser plate that swirls primary air is described.

12 Claims, 2 Drawing Sheets

MEANS FOR PROVIDING OXYGEN ENRICHMENT FOR SLURRY AND LIQUID FUEL BURNERS

TECHNICAL FIELD

The present invention is directed to apparatus for a fuel burner wherein oxygen enriched gas is supplied to the primary oxidant gas through a diffuser plate. More specifically, the present invention is directed to apparatus for a coal-water slurry burner, wherein oxygen is supplied through the trailing edges of vanes of a diffuser plate to aid ignition of the fuel with the primary air, to stabilize combustion of the coal-water slurry and to bring the flame zone closer to the nozzle from which the coal-water slurry emanates.

BACKGROUND OF THE PRIOR ART

Fuel burners and coal-water slurry burners are known in the prior art, wherein it is further known to provide oxygen enrichment, particularly oxygen enrichment of primary air. In U.S. Pat. No. 4,515,095 a process for combusting a coal-water slurry, wherein the primary air is enriched with oxygen, is identified in which it is reported that oxygen enrichment reduces the ignition time delay and brings the flame zone closer to the fuel burner nozzle.

U.S. Pat. No. 4,407,205 discloses coal combustion with swirling vanes for swirling combustion air.

U.S. Pat. No. 4,541,796 disclose a burner using oxygen enrichment, in which a plurality of oxygen jets surround the fuel jet nozzle.

U.S. Pat. No. 4,591,331 discloses a fuel burner for burning pulverized coal, having an inner fuel carrying passage and an outer oxygen-enriched combustion supporting gas passage.

U.S. Pat. No. 4,523,529 discloses a burner for the combustion of solid fuels, wherein oxygen jets surround the central fuel passage and the oxygen jets are in turn isolated by a blanketing shield of moderator gas in an annular passage.

U.S. Pat. No. 4,519,322 discloses a burner for coal-water slurries with circumferentially overlapping vanes mounted concentric to the fuel supply means.

U.S. Pat. No. 3,124,086 discloses a burner having tangential oxidant supply lines to the central fuel delivery line.

U.S. Pat. No. 4,193,773 discloses a burner for combusting pulverized coal wherein oxygen is supplied from a manifold having both perpendicular and tangential apertures opening into the coal supply line.

Although the prior art describes oxygen enrichment of primary air in a burner to the extent of 22 to 25 percent oxygen in the total air supplied to the burner and the beneficial effect this has on the combustion of coal water slurries, this is generally accomplished by homogeneous mixing for upstream of the burner. The present invention enhances operation over the prior art by providing higher oxygen concentrations in the immediate vicinity of the combustion.

All of the prior art describes burner designs which fail: (a) to encompass a blending and intermixing of the oxygen readily with fuel to stabilize the fuel flame, and (b) to avoid direct contact of the oxygen delivery source with the fuel delivery source, which would degrade the burner by fuel or carbon deposits which exceed, in conjunction with the oxygen, material temperature design limits. The present invention, as set forth below, overcomes these drawbacks.

BRIEF SUMMARY OF THE INVENTION

The present invention is a fuel burner comprising a central axial fuel nozzle, a first annular shell defining a first passage surrounding the nozzle for delivery of primary oxidant gas, a combustion zone downstream of the nozzle where the fuel is combusted with the gas, and a diffuser plate for swirling the gas into the combustion zone, wherein the diffuser plate includes means for dispensing oxygen-enriched gas to the primary oxidant gas supplied by conduit means.

Preferably the diffuser plate has a series of vanes emanating radially outward from the fuel nozzle. More specifically, the vanes have at least one trailing edge curved outward from the plane of the diffuser plate, such that the edge is directed in the downstream direction of the flow of the primary oxidant gas in the first passage. More specifically, the diffuser plate has an at least partially hollow interior with apertures communicating with the first passage constituting the means for dispensing of oxygen-enriched gas.

Preferably, the apertures are located in the trailing edge of the vanes.

Preferably, the burner has a second annular shell defining a second passage, surrounding the first annular shell, for delivery of secondary oxidant gas to the combustion zone.

Alternatively, the apertures are located in the face of the vane adjacent to the combustion zone. Further alternatively, the apertures can be located in the edge of the vane opposite the trailing edge.

Preferably, the burner is sized for operation in the range of approximately 2 to 400 million BTU's per hour.

Preferably, the burner is a coal-water slurry burner, wherein the central axial fuel nozzle is sized and constructed to delivery a fuel of coal-water slurry.

More specifically, a preferred embodiment of the present invention is a coal-water slurry burner sized for operation in the range of approximately 2 to 400 million BTU's per hour, comprising a central axial coal-water slurry nozzle, a first annular shell defining a first passage surrounding the nozzle for delivery of primary oxidant gas, a combustion zone downstream of the nozzle where the coal-water slurry is combusted with the primary oxidant gas, and a diffuser plate having multiple vanes emanating radially outward from the nozzle, in which the vanes have a trailing edge curved outward from the plane of the diffuser plate, such that the edges are directed in the downstream direction of the flow of the primary oxidant in the first annular passage, wherein the vanes have a dispenser of oxygen-enriched gas comprising a hollow interior with apertures communicating with the first passage through the trailing edge of the vane.

Preferably, the burner has a second annular shell defining a second passage surrounding the first passage for delivery of secondary oxidant gas to the combustion zone.

Preferably, the dispenser is designed to provide commercially pure oxygen.

DETAILED DESCRIPTION OF THE DRAWINGS

DETAILED DESCRIPTION OF THE INVENTION

Figure 1:
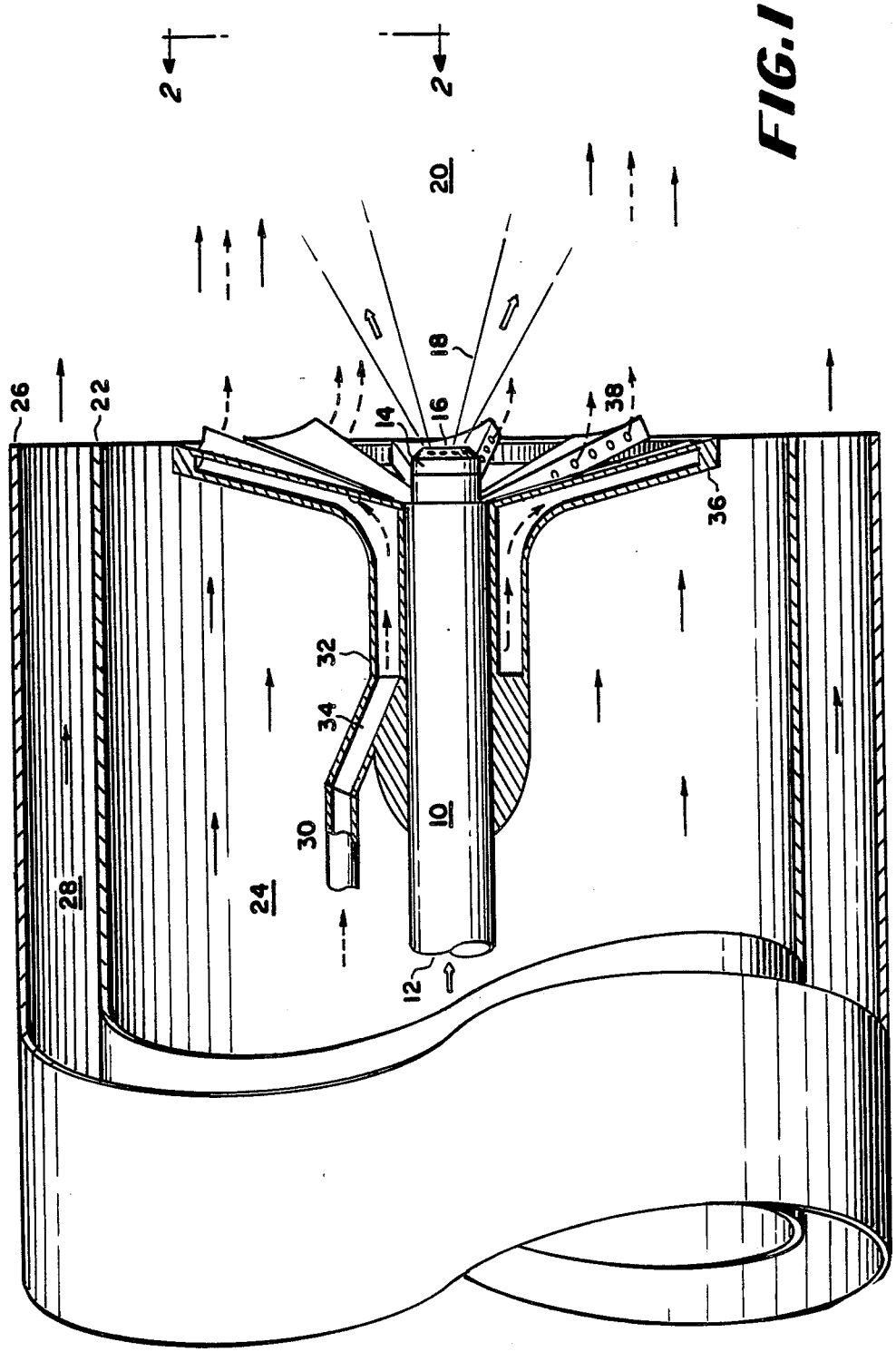
FIG. 1 is a cross-sectional illustration of a preferred embodiment of the burner of the present invention with vanes having a downstream curvature.

The present invention provides a means of adding oxygen-enrichment to a coal-water slurry or liquid fuel burner without complicated equipment and without concern over adjacent delivery of oxygen and fuel, whereby the fuel or combustion products would otherwise tend to coat the oxygen delivery site and induce high temperatures and material failures during operation. Essentially in the present invention, oxygen-enriched gas or commercially pure oxygen is injected into a modified diffuser plate similar to the diffuser plates used in traditional liquid fuel burners. Oxygen enrichment in this manner has been found to overcome several problems related to combustion, particularly of coal-water slurries. Typically, use of coal-water slurries in oil-designed boilers can cause a loss of capacity to the boiler. Oxygen enrichment can partially overcome this loss of rating. Loss of boiler rating may be minimized by a number of means including improved slurry atomization, finer pulverization of coal fuel, increased swirl of the primary air to the burner or use of additional devices such as rotary cup burners. The present invention utilizes in addition to those possible solutions, the apparatus necessary for delivery of oxygen close to the fuel spray or fuel nozzle, wherein a diffuser plate which also contains distribution means for oxygen to the combustion zone of the burner is provided.

The use of coal-water slurries in boilers originally designed for residual oil, is motivated by the lower cost of coal-water slurry fuels. Adapting coal-water slurries to oil designed boilers however, is known to present a number of operating problems within the boiler. One problem in particular is the relatively slow ignition of a slurry in comparison to residual oil, partly because of the need to evaporate the water prior to devolatilizing the coal particles to cause subsequent ignition of particles. Further, the burnout time of the particles is long in comparison to that of droplets of residual oil. Thus, in order to have the coal-water slurry combustion completed prior to exiting an oil-design furnace, it is imperative that ignition begin as close to the spray nozzle as possible. Studies of coal-water slurry ignition and combustion reveal the importance of achieving coal-water slurry ignition at the nozzle. Without applying certain means to achieve this desired early ignition, the coal-water slurry flame is likely to destabilize which is less desirable for achieving boiler heat transfer capacity and overall satisfactory boiler performance. Flames in coal-water slurry burners lift away from the nozzle of the burner and cause the unstable condition.

It has been determined that in order to effectively and efficiently burn difficult fuels, such as coal-water slurries, the combustion factors need to be optimized, including satisfactory fuel atomization using compressed air or oxidant gas, the proper grind of coal, high swirl flows in which the axial flow of combusting air through the combustion zone is swirled to achieve a spiral type of air flow, and high oxygen concentration of up to 100% flow immediately surrounding the nozzle.

The criticality of close placement of oxygen to the fuel nozzle has been demonstrated. Oxygen enrichment of either the primary air or all air to the burner is not as effective in stabilizing combustion as providing high concentration most adjacent to the fuel spray source leaving the fuel source.

However, there are at least four problems associated with placing high oxygen concentration at or near the nozzle of the fuel burner, such as a coal-water slurry burner. These problems are: (a) if delivered via tubes, the very high axial velocity of oxygen exiting the oxygen tubes tends to blow coal-water slurry flames away from the nozzle, especially when high levels of oxygen flows are utilized which tends to destabilize the flame rather than stabilize the flame, (b) for utility and large industrial boilers the enriching oxygen has to be distributed over a large spray angle and spray zone produced by fuel nozzles which typically have multiple spray orifices, and (c) enriching oxygen should not be placed in direct contact with a nozzle, particularly one designed of metal which can become quite hot, coated with soot, coke or fuel deposits, and when the flame is brought back to be very close to the fuel nozzle which is desirable for boiler capacity and optimized heat transfer, ash and some soot can build up on the end of the oxygen delivery means and induce undesirably high localized temperatures, or even burning of the nozzle area itself.

It is known that to stabilize combustion in burners, such as residual oil burners, by the aid of a diffuser plate which surrounds the fuel nozzle. Such plates function by disturbing a portion of the combustion air flow, that is the air flowing through the open areas and over the outer diameter of the plate. Such plates assure highly turbulent flow and flow recirculation zones downstream of the plate. These recirculation zones improve air and fuel mixing and encourage partially burned fuel and gases to recirculate back into the unburned mixture to aid ignition. All of these effects improve flame stability. The plate aids ignition by restricting the air flow near the nozzle, thus providing a richer overall mixture near the nozzle. Additional turbulation can be created by swirling of combustion air, wherein the diffuser plate has various vanes directing the flow of air or oxidant gas in a tangential or spiral manner into the combustion zone downstream of the fuel nozzle.

The present invention utilizes a diffuser plate to function also as an oxygen distribution means for fuel or coal-water slurry combustion, wherein the diffuser plate incorporates a swirl vane assembly. In this manner, the oxygen or oxygen-enriched gas is placed very near the fuel spray stream, but is not directed at the nozzle and is not generally directed axially into the burner, wherein it might blow the flame away from the nozzle head.

the diffuser plate may be constructed as a three-layer sandwich with the center layer containing the oxygen passages, which in turn distribute the oxygen to holes or apertures in the edges of the vanes. These holes or apertures permit the oxygen to exit tangentially from the vane into the open areas in the diffuser plate between the vanes and mix with the axial movement of the oxidant gas of the primary oxidant gas flow of the burner. The oxygen can be transported or supplied to the center layer of the vanes of the diffuser plate by an oxygen pipe or conduit via the hub of the burner.

Preferably, the apertures or holes in the edge of the vanes are in the trailing edge, but alternatively they be in the downstream face of the vanes, or they may be in the edges of the vanes opposite the trailing edge.

Several alternatives are considered in the present invention without being illustrated. Apertures in the vanes may be situated both at the trailing edge and the opposite edge simultaneously to result in a low net axial velocity component. However, if the openings are placed on one side of the vanes, the exiting oxygen velocity will impart additional swirl motion to the primary oxidant gas or air passing through the open spaces between the vanes. A desirable result can be achieved by the select distribution of the apertures in the vanes according to the radial direction along the edge of the vanes, wherein the concentration of the apertures can be reduced as one goes outward along the radius from the burner axis. This provides a higher concentration of oxygen near the fuel nozzle.

Preferably, the vanes are formed with a downstream curvature so that the trailing edge is downstream of the plane of the diffuser plate. Although the oxygen dispensing means is illustrated as hollow passages within the vanes of the diffuser plate, it is within the contemplation of the present invention to have separate conduits attached to or juxtaposed against the diffuser plate for supply of the enriching oxygen. This can take the form of a central manifold with a series of pipes welded or fused to the diffuser plate, either on the upstream or downstream side with an array of individual oxygen nozzles or apertures providing the full distribution of the oxygen or oxygen-enriched gas to the burners combustion zone.

preferably, the oxygen or oxygen-enriched gas dispenser is an oxygen compatible material such as Monel, stainless steel or brass.

The present invention will now be described in greater detail with reference to the accompanying drawings. In FIG. 1 a preferred embodiment to the present invention is shown in cross-section, wherein a central axis fuel nozzle 10 having an interior 12 for delivering fuel or coal-water slurry in conjunction with compressed atomizing air or oxidant gas, ends in a cap or nozzle end 14, having fuel and atomizing gas orifices 16 which deliver a spray of fuel 18 into a combustion zone 20, which is downstream of the burner apparatus. A first passage 24 surrounds the nozzle 10, for delivery of primary oxidant gas, such as air, to the combustion zone 20. A diffuser plate 36 swirls a portion or all of the primary oxidant gas or air in passage 24 as it heads downstream to the combustion zone 20. The diffuser plate is also known as a flame holder, swirl plate, swirller, air swirller, burner shield or similar technology. The air or oxidant gas within 24 may have some swirl imparted by additional means prior to arrival at the diffuser plate 36. The diffuser plate 36 has a dispenser juxtaposed adjacent the plate for oxygen-enriched gas or commercially pure oxygen supplied by an oxygen conduit 30 which passes oxygen in line 34 through a hub 32 attached to the nozzle 10, wherein the oxygen then passes through the hollow diffuser plate 36 and exits into the primary oxidant gas or air in a plurality of apertures 38. Additionally, a secondary oxidant gas or air can be introduced into the combustion zone 20, which second passage 28 for the secondary air is defined by the first annular outer wall or shell 22 of the primary air and the second annular outer wall or shell 26 of the burner. Tertiary gas flows may also be added to the combustion process via passages at radaii beyond 26.

Figure 2:
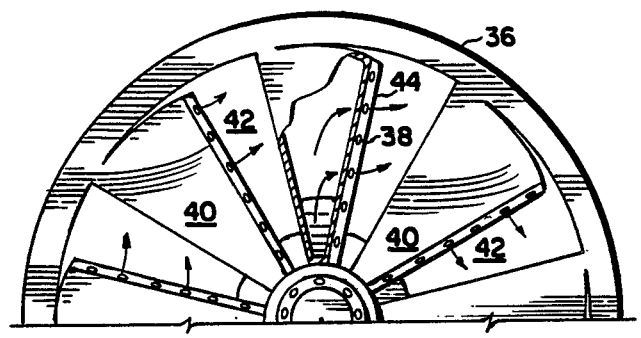
FIG. 2 is a partial view of the diffuser plate of FIG. 1, showing an alternative preferred embodiment of the vanes of the present invention wherein the vanes have a downstream curvature.

The structure of the vanes of the diffuser plate 36 will be better appreciated in their preferred embodiment by reference to FIG. 2. In this illustration, the vanes 40 having trailing edges 44, are fabricated into the diffuser plate 36. The trailing edges 44 of the vanes 40 have a plurality of apertures 38 which provide the oxygen-enriched gas or commercially pure oxygen to the primary oxidant gas or air passing through the opening 42 in the diffuser plate, which is being swirled by the vane 40. It can be appreciated that this preferred vane has at least one trailing edge curved outward from the plane of the diffuser plate, such that the edge is directed in the downstream direction of the flow of the primary oxidant gas in the first annular passage, wherein the outer curved edge 44 is generally closer to the combustion zone 20, than is the major portion of the diffuser plate 36.

In some burner designs the diffuser plate may be moved axially within passage 24 to optimize combustion as a function of fuel flow rate. It is also possible to vary the location of tip 16 in relation to the diffuser plate 36 and both of these options are contemplated for inclusion in the present invention.

Figure 3:
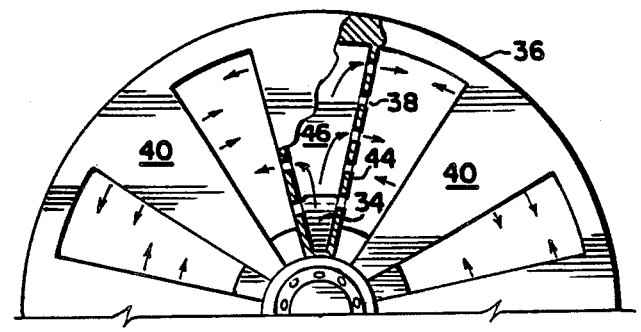
FIG. 3 is a partial sectional illustration of the burner diffuser plate of FIG. 1 showing a preferred embodiment of the vanes with essentially flat vanes.

With reference to FIG. 3, an alternate embodiment of the dispenser of the present invention will be further appreciated. The diffuser plate 36 which surrounds the fuel nozzle 10 has a series of essentially flat or uncurved vanes 40 emanating outward from the axis of the fuel nozzle with trailing edges 44, having a plurality of apertures 38, supplied by a central at least partially hollow interior 46 in each vane. A cutaway view of only one such vane is shown in FIG. 3 for illustration purposes. This central hollow interior space 46 is in turn supplied with oxygen-enriched gas flow through the gas passage 34 in the hub 32. Although illustrated with apertures evenly spaced along only the trailing edge of the vanes, it is anticipated by the present invention that apertures could be located in the face of the vane 40 adjacent the combustion zone 20 or in the leading edge of the vane 40 opposite the trailing edges 44. It is also contemplated that the apertures 38 may be concentrated more toward the radial inner part of the diffuser plate so as to concentrate oxygen delivery near the fuel source.

The present invention overcomes the disadvantages of the prior art, by providing a simple efficient means of delivery oxygen-enriched gas or commercially pure oxygen to a burner burning a difficult or boiler-derating fuel, such as coal-water slurry, without incurring the disadvantages of direct oxygen and fuel mixture or suffering from the problems of adjacent fuel and oxygen dispensing wherein the opportunity would otherwise exist for the oxygen delivery nozzle to undergo temperature failure. By providing oxygen delivery through swirl vanes for the primary oxidant gas, the present invention provides close, but not direct contact of the oxygen source with the fuel spray near its source to the appropriate burner and further provides additional swirling induced by the oxygen delivery, while enjoying the enhanced mixing that comes from dispensing oxygen directly into the primary air which is already being swirled by means, such as a diffuser plate. These attributes result in the benefit of efficient stable burning of difficultly burned fuel, such as coal-water slurry, with reduced ignition delay, closer flame zone to burner nozzle and resulting stabilized flame, low burner maintenance and higher burner rating for increased heat transfer.

The present invention has been set forth with regard to a specific preferred embodiment, however the full scope of the invention should be ascertained from the claims which follow.

I claim:

1. A fuel burner comprising a central axial fuel nozzle, a first annular shell defining a first passage surrounding said nozzle for delivery of primary oxidant gas, a combustion zone downstream of said nozzle where the fuel is combusted with said gas and a diffuser plate for swirling said gas into said combustion zone, wherein said diffuser plate has a series of vanes emanating radially outward from said fuel nozzle, said vanes include conduit means for dispensing oxygen-enriched gas to the primary oxidant gas such oxygen-enriched gas supplied by a pipe means.

2. A fuel burner comprising a cental axial fuel nozzle, a first annular shell defining a first passage surrounding said nozzle for delivery of primary oxidant gas, a combustion zone downstream of said nozzle where the fuel is combusted with said gas and a diffuser plate for swirling said gas into said combustion zone, wherein said diffuser plate has a series of vanes emanating radially outward from said fuel nozzle wherein said vanes have at least one trailing edge curved outward from the plane of said diffuser plate such that said edge is directed in the downstream direction of the flow of said primary oxidant gas in said first passage and said diffuser plate includes means for dispensing oxygenenriched gas to the primary oxidant gas supplied by a pipe means.

3. The apparatus of claim 2 wherein said diffuser plate has an at least partially hollow interior with apertures communicating with said first passage constituting said conduit means for dispensing of oxygen-enriched gas.

4. The apparatus of claim 3 wherein said apertures are located in said trailing edge of said vanes.

5. The apparatus of claim 4 wherein said burner has a second annular shell defining a second passage, surrounding said first annular shell, for delivery of secondary oxidant gas to said combustion zone.

6. The apparatus of claim 3 wherein said apertures are located in the face of the vane adjacent said combustion zone.

7. The apparatus of claim 3 wherein said apertures are located in an edge of the vane opposite said trailing edge.

8. The apparatus of claim 2 wherein said burner is sized for operation in the range of approximately 2 to 400 million BTU's per hour.

9. The apparatus of claim 2 wherein said burner is a coal-water slurry burner wherein said central axial fuel nozzle is sized and constructed to deliver a fuel of coal-water slurry.

10. A coal-water slurry burner sized for operation in the range of approximately 2 to 400 million BTU's per hour, comprising: a central axial coal-water slurry nozzle, a first annual shell defining a first passage surrounding said nozzle for delivery of primary oxidant gas, a combustion zone downstream of said nozzle where the coal-water slurry is combusted with said primary oxidant gas, and a diffuser plate having multiple vanes emanating radially outward from said nozzle which vanes have a trailing edge curved outward from the plane of said diffuser plate such that said edges are directed in the downstream direction of the flow of said primary oxidant gas in said first passage, wherein said vanes have a dispenser of oxygen-enriched gas comprising a hollow interior with apertures communicating with said first passage through said trailing edge of said vanes.

11. The apparatus of claim 10 wherein said burner has a second annular shell defining a second passage, surrounding said first passage, for delivery of secondary oxidant gas to said combustion zone.

12. The apparatus of claim 10 wherein said dispenser is designed to provide commercially pure oxygen.

* * * * *